LUCY S. NOURSE.
Flour-Sifters.
No. 5,248. Reissued Jan. 21, 1873.
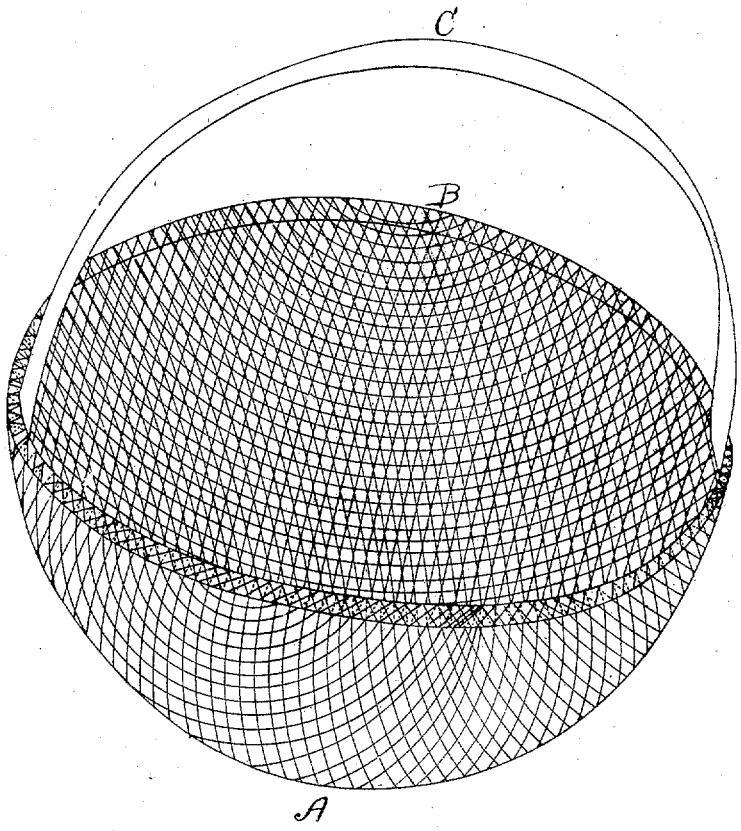
Witnesses.
Chas. B. Stule
Phil. C. Hasi.
Inventor:
Lucy Sawyer Nourse.
Chipman Fosmer & Co.
Attorneys.
AM. PHOTO-LITHOGRAPHIC CO. N.Y. (OSBORNE'S PROCESS)

UNITED STATES PATENT OFFICE.

LUCY S. NOURSE, OF BARRE, MASSACHUSETTS, ASSIGNOR TO H. A. HILDRETH AND W. J. JOHNSON.

IMPROVEMENT IN FLOUR-SIFTERS.

Specification forming part of Letters Patent No. 110,672, dated January 3, 1871; antedated December 17, 1870; reissue No. 5,248, dated January 21, 1873.

*To all whom it may concern:*

Be it known that I, LUCY S. NOURSE, of Barre, in the county of Worcester and State of Massachusetts, have invented a new and valuable Improvement in Flour-Sifters; and I do hereby declare that the following is a full, clear, and exact description of the construction and operation of the same, reference being had to the annexed drawing making a part of this specification, and to the letters and figures of reference marked thereon.

The figure of the drawing is a representation of my flour-sifter.

My invention consists of a sifter of a somewhat conical form, constructed of woven wire that may be used by pressing it directly on and into the mass of the flour or other substance to be sifted, and there turning it to the right and left a little distance alternately, the flour or other article passing upward and inward through the meshes or holes in the sifter, and is thus rendered fine and separated from lump, bran, or impurities, and measured; and may also be carried in the sifter to a pan, molding-board, or other place desired without dust, or contact with the operator.

In the accompanying drawing, A represents the body of the sifter, which is constructed of wire-cloth, or wire woven together, with spaces between the wires to allow the flour or other substance to pass through, and is pressed into the form desired. My usual method of constructing this body is to strike it up over a former of the proper shape and size. The actual shape of this body is not material, provided it be made smaller at the bottom than at the top, and has a gradual and uniform inclination or flare outward, so as to present, as nearly as possible, all the meshes or openings in the cloth to the substance to be sifted, as the sieve passes downward. B represents a strong metallic band fastened around the edge of the sifter by bending the wires over it, or soldering, for the purpose of strengthening the sifter-wires. C represents a metallic handle, extending over and across the top or open side of the sifter, and attached to the rim B by suitable means.

The sifter is operated by grasping the handle firmly in the hand; then pressing the bottom on or into the flour or other article to be sifted; then turning the sifter right and left a little distance alternately, as far as the hand of the operator can conveniently turn; then, by causing the flour or other material to pass upward and inward through the meshes or holes in the sifter to the inside; and this process is continued until the sifter is full, which, being constructed of a definite size, as one quart or one pint, serves as a measure of the quantity which is thus pressed within the sifter. It may be lifted and carried with the contents to a pan, molding-board, or other convenient place, as in a scoop, and there poured from the top, or again sifted through the meshes or holes outward by shaking, as with an ordinary sieve.

I am aware that wire-cloth is used for sieves, and that it is also woven or pressed into a somewhat similar shape, and used for dish-covers, and do not claim the wire-cloth or the particular form of the body of the sifter as applied to those and other purposes.

What I claim as my invention in flour-sifters is—

1. The sieve, having a body, A, of wire-cloth, a rim, B, and an operating-handle, adapted for sifting through the interstices of the body inward from the outside, substantially as specified.

2. The combined sieve and measure herein described, having its bottom and sides of wire-cloth, a rim, B, and operating-handle, arranged and adapted for use, as specified.

3. A sieve having the body A formed of wire-cloth pressed into a dish-shaped receptacle, smaller at its bottom than at its top, with outwardly-inclined surface arranged to present all the openings of the cloth to the substance to be sifted, as the sieve is passed downward, substantially as specified.

In testimony that I claim the above I have hereunto subscribed my name in the presence of two witnesses.

LUCY S. NOURSE.

Attest:

PROCTOR OTIS,
FRED. J. FOX.